United States Patent [19]
Chae

[11] Patent Number: 5,309,728
[45] Date of Patent: May 10, 1994

[54] CONTROL APPARATUS FOR MULTIPLE UNIT AIR CONDITIONING SYSTEM

[75] Inventor: Y. Byoung Chae, Seoul, Rep. of Korea

[73] Assignee: Samsung Electronics Co., Ltd., Suwon, Rep. of Korea

[21] Appl. No.: 47,361

[22] Filed: Apr. 19, 1993

Related U.S. Application Data

[63] Continuation of Ser. No. 824,541, Jan. 23, 1992, abandoned.

[30] Foreign Application Priority Data

Jan. 30, 1991 [KR] Rep. of Korea ............. P91-1354

[51] Int. Cl.$^5$ .................. F25B 7/00; F25B 41/04; G05D 23/32
[52] U.S. Cl. ...................... 62/158; 62/175; 62/196.4
[58] Field of Search .......... 165/22, 158, 175, 204; 236/49.3; 62/196.4

[56] References Cited

U.S. PATENT DOCUMENTS

| | | | |
|---|---|---|---|
| 2,403,818 | 7/1946 | McGrath | 62/204 |
| 3,599,006 | 8/1971 | Harris | 62/158 |
| 3,777,240 | 12/1973 | Neill | 62/158 |
| 4,254,633 | 3/1981 | Murakami et al. | 62/158 |
| 4,384,462 | 5/1983 | Overman et al. | 62/175 |
| 4,510,767 | 4/1985 | Komatsu et al. | 62/204 |
| 4,637,220 | 1/1987 | Sakano | 62/204 |
| 4,679,404 | 7/1987 | Alsenz | 62/175 |

FOREIGN PATENT DOCUMENTS

| | | | |
|---|---|---|---|
| 0028835 | 3/1978 | Japan | 62/175 |
| 0050138 | 4/1979 | Japan | 62/175 |
| 0146446 | 11/1979 | Japan | 62/158 |
| 0075148 | 6/1980 | Japan | 62/158 |
| 0012243 | 1/1982 | Japan | 62/158 |
| 0059214 | 4/1982 | Japan | 62/158 |
| 0062345 | 4/1982 | Japan | 62/158 |
| 0062427 | 4/1982 | Japan | 62/158 |
| 0180848 | 8/1986 | Japan | 62/175 |
| 62-12446 | 1/1987 | Japan | |

*Primary Examiner*—John K. Ford
*Attorney, Agent, or Firm*—Burns, Doane, Swecker & Mathis

[57] ABSTRACT

The operation of indoor devices in a multiple unit air conditioning system are monitored by an operation sensing portion. After all the indoor devices are turned off, the compressor continues to operate for a length of time determined by the time constant delay portion and then is turned off. Once the solenoid valves 4 feeding refrigerant to the indoor heat exchangers 3 are closed, the continued operation of compressor 6 causes an overpressure relief valve 8 to open. This equalizes the pressure difference between the suction line and the high pressure discharge line of the compressor and thereby allows for faster restarts than a conventional bypass line 9.

2 Claims, 5 Drawing Sheets

CONTROL APPARATUS FOR MULTIPLE UNIT AIR CONDITIONING SYSTEM

This application is a continuation of application Ser. No. 07/824,541, filed Jan. 23, 1992, now abandoned.

BACKGROUND OF THE INVENTION

The present invention relates to a control apparatus for a multiple unit air conditioning system, and particularly to a control apparatus which first adjusts the pressure of refrigerant in a compressor in order to prevent the compressor from being subjected to high pressure and then rapidly initiates the next system operation by turning off the compressor after a predetermined delay interval from the time that the independent indoor devices are turned off.

Conventionally, an indoor air conditioning refrigerant cycle is designed as shown in FIG. 1. An indoor device 1 is installed in a room of a building and is composed of an evaporator 3, an expansion valve 2 and a solenoid valve 4. The evaporator 3 cools the air in the room by heat-exchanging the air by changing low temperature and low pressure liquid refrigerant into gas. The expansion valve 2 changes the liquid refrigerant which is high in temperature and high in pressure into liquid refrigerant which is low in temperature and low in pressure. The solenoid valve 4 opens or closes to control the flow of the liquid refrigerant that is sent to the indoor device 1 according to the control signal from a refrigerant control section. Refrigerant distributor 5 distributes liquid refrigerant to the evaporators 3. Compressor 6 receives low temperature and low pressure gas refrigerant from the evaporators 3 and compresses the gas refrigerant thereby heat-exchanging the heat produced by compressing the air around it which changes the gas refrigerant into a gas refrigerant with a high temperature and high pressure. Pressure relief valve 8 at the outdoor device diverts the refrigerant from the inlet of the compressor 6 to a condenser 7 when the pressure of the refrigerant is higher than a predetermined pressure. Bypass conduit 9 diverts the refrigerant to a high pressure refrigerant distributor 5 thereby balancing the pressure.

In the multiple unit air conditioning system which is designed as described above, if all evaporators 3 in the indoor devices 1 are turned off, the compressor 6 is also simultaneously turned off. Accordingly, when all evaporators 3 in the indoor devices 1 are turned off, as shown in FIG. 1, the solenoid valves 4 of indoor devices 1 the refrigerant, so that the refrigerant in the outdoor device does not flow into the indoor devices 1. At this time, the refrigerant discharged from the compressor 6 reverses direction which causes the compressor 6 to become over-pressured. Because of the unbalanced pressure generated in the compressor 6, the compressor 6 becomes overloaded and the rotation shaft of the compressor 6 may cause the shaft to become unbalanced and disposed at an abnormal position where the compressor does not operate efficiently. In a conventional apparatus, in order to solve this problem, the pressure balance is achieved by the bypass conduit 9 until the rotation shaft of the compressor 6 returns to the normal position. However, because the pressure balance cannot be achieved without the passage of some time, the conventional apparatus has the problem that it does not restart rapidly.

A typical example of the prior art is disclosed in Japanese Utility Model Laid-Open Sho 62-12446. This apparatus can change, at any time, the number of the connected units to a different arbitrarily determined number of units. However, it does not prevent the compressor from being overloaded when all units in the indoor device are turned off.

SUMMARY OF THE INVENTION

Accordingly, in order to solve the above-stated problem, the present invention was devised.

It is an object to provide a control apparatus which rapidly adjusts the pressure by turning off the compressor of the outdoor device after a predetermined time delay from the time that the indoor devices are turned off.

It is another object to provide a control apparatus which prevents a compressor from being reversely compressed in due to a surge in reversed pressure after all the indoor devices are turned off.

It is another object to provide a control apparatus which adjusts the pressure applied to a compressor without using a bypass conduit.

In order to achieve these objects, the operation of indoor devices are monitored by an operation sensing portion. After all the indoor devices are turned off, the compressor continues to operate for a length of time determined by the time constant delay portion and then it is turned off.

DETAILED DESCRIPTION OF THE PREFERRED EMBODIMENT

Figure 2:
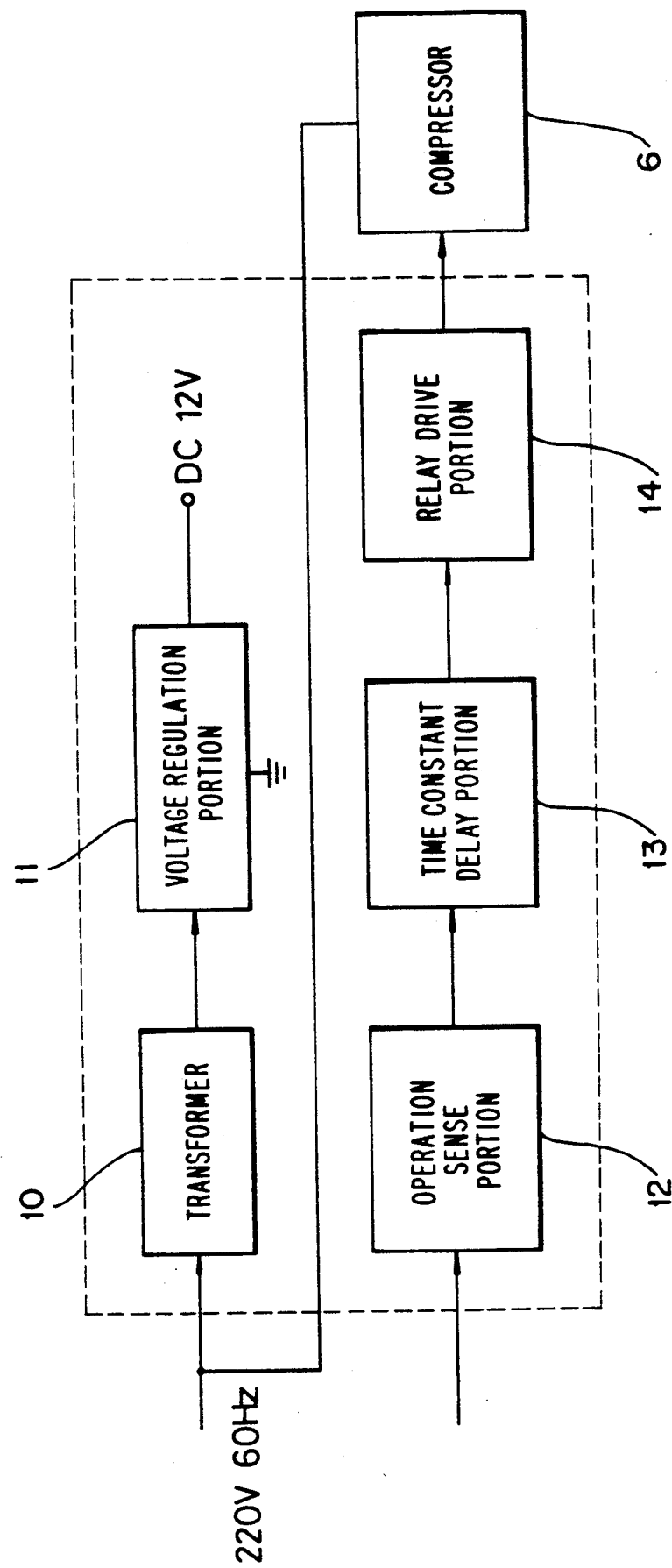
FIG. 2 is a block diagram of the control apparatus according to the present invention.

In reference to the drawings, the embodiment of the present invention is described as follows:

FIG. 2 is a block diagram showing the control apparatus of the multiple unit air conditioning system. A transformer 10 transforms A.C. power to the predetermined D.C. voltage, and a voltage regulation portion 11 regulates the voltage output from the transformer 10. An operation sensing portion 12 evaluates all indoor devices which are mounted in various rooms of a building or apartment... and then transmits a predetermined signal according to the result of the evaluation. A time constant delay portion 13 receives the signal output from the operation sensing portion 12 and transmits the signal after the predetermined time delay. A relay drive portion 14 receives the transmitted signal from the time constant delay portion 13 and operates the relay according to the transmitted signal, so that the compressor is turned on or off by the relay in the relay drive portion 14.

Figure 3:
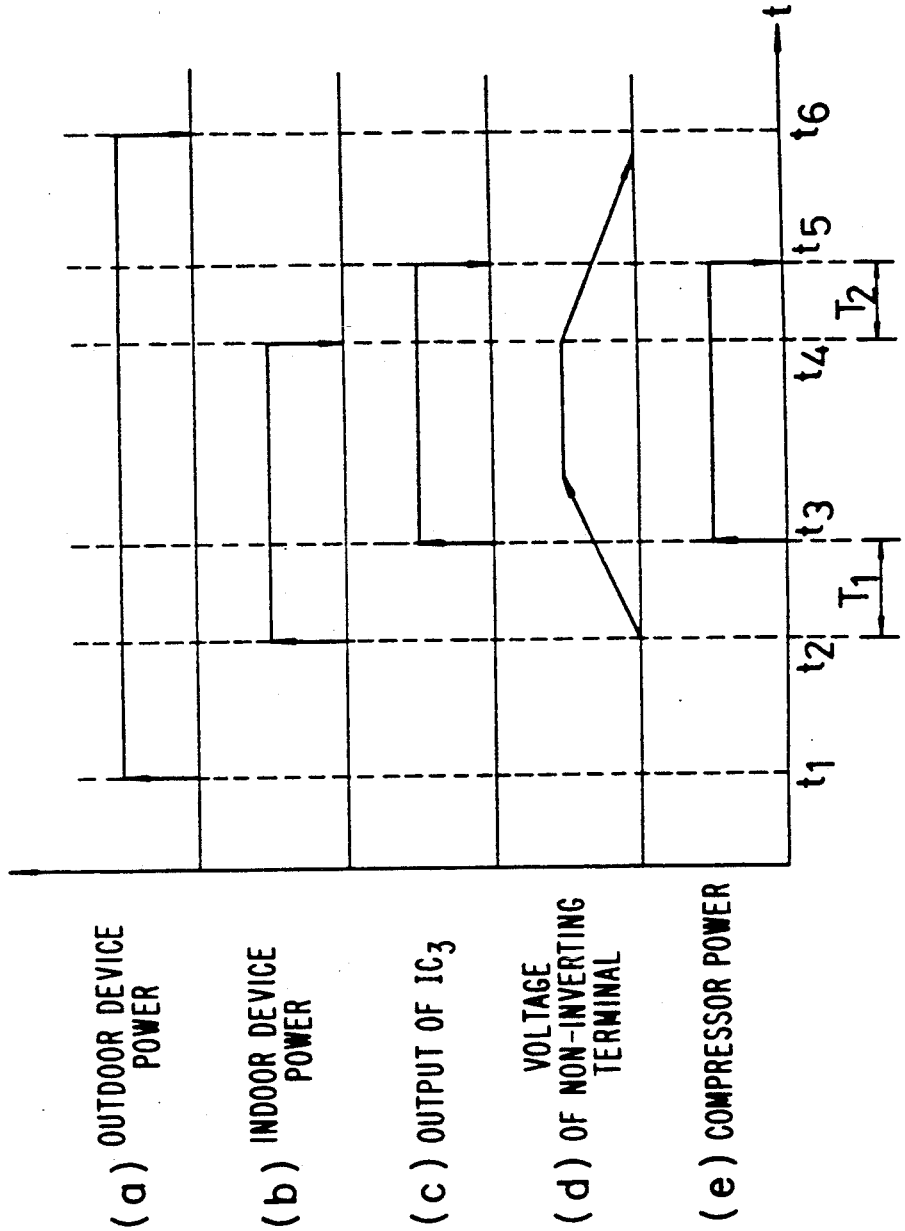
FIG. 3(a)-3(e) is a timing chart showing the signal applied to each part of the control apparatus according to the present invention.
Figure 4:
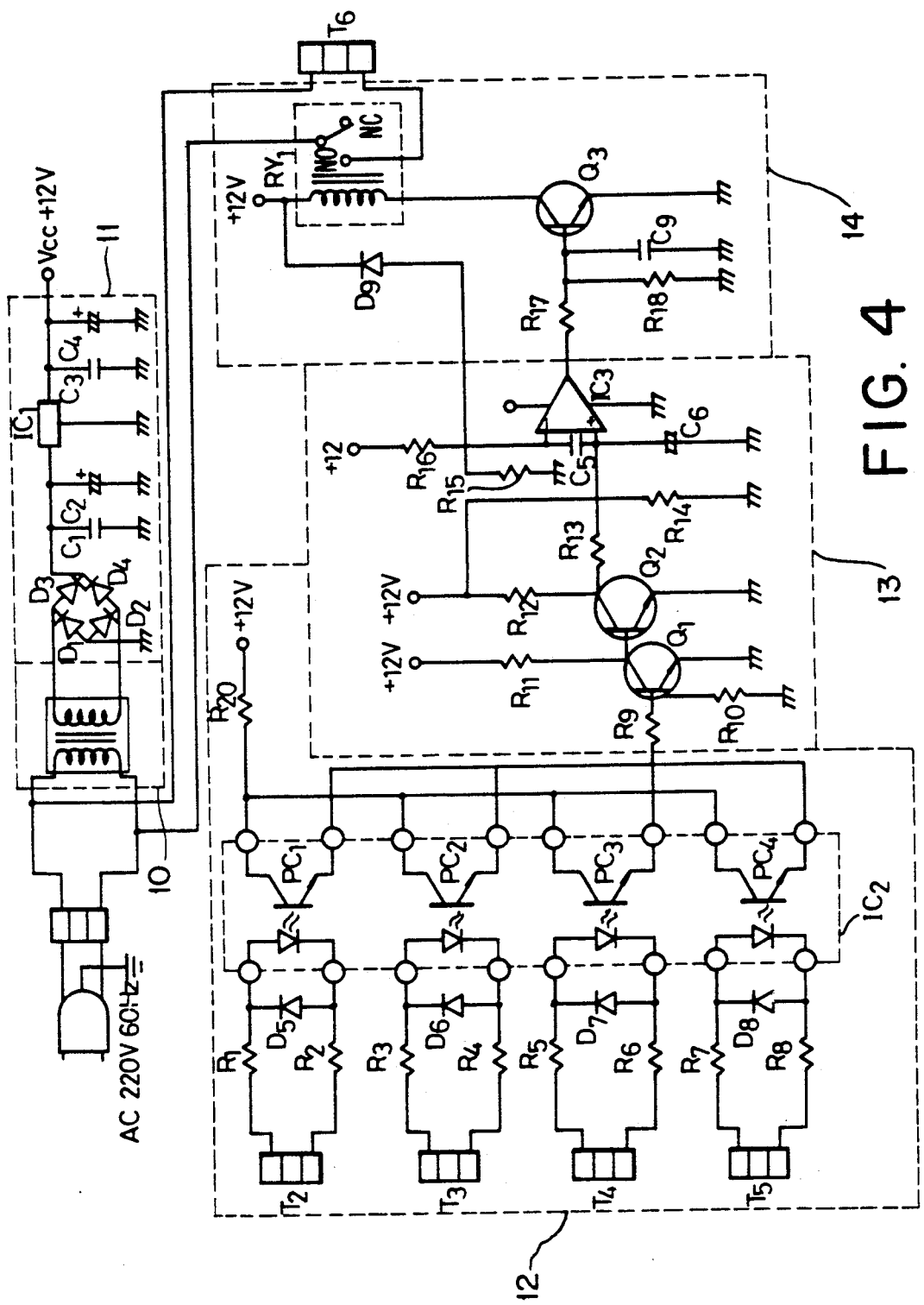
FIG. 4 is a circuit diagram of the control apparatus according to the present invention; and, FIG. 5 is a block diagram showing a refrigerating cycle in accordance with the present invention.
Figure 5:
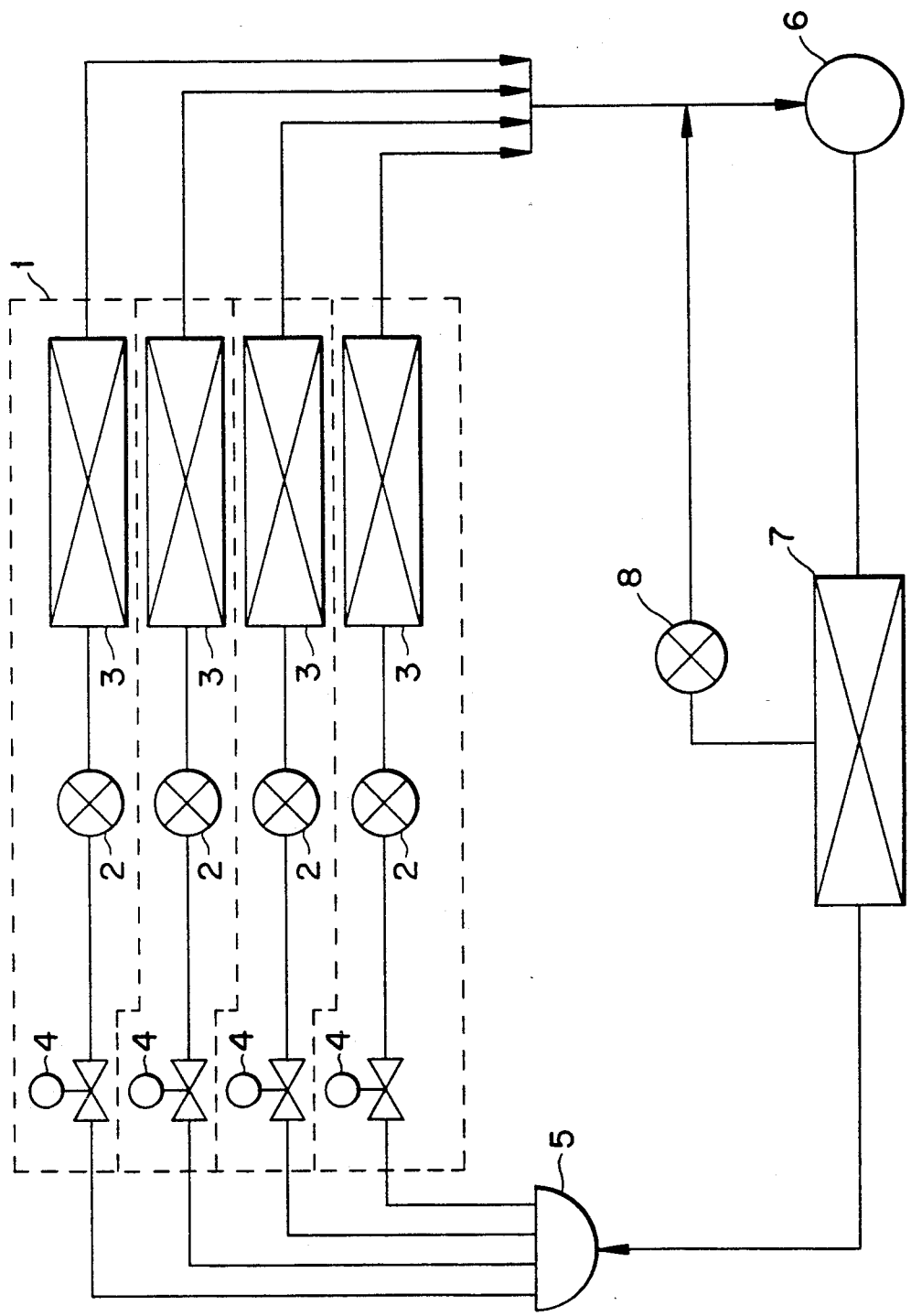

In reference to FIG. 2, FIG. 3 and FIG. 4, the operation of the apparatus according to the present invention is described as follows:

A power (A.C. 220 V) is applied to the apparatus according to the present invention at time t1 as shown in FIG. 3 (a). Transformer 10 transforms the A.C. power to the predetermined D.C. voltage and supplies the D.C. power to the voltage regulation portion 11. The voltage output from the voltage regulation portion 11 is applied to each portion of the apparatus as shown in FIG. 4. An operation sensing portion 12 is electrically connected to all the indoor devices and senses the operations of the indoor devices. As shown in FIG. 4, each of the connecting terminals T2-T5 of the operation sensing portion 12 are connected to each unit of the indoor devices 1. Thus, if power is supplied to the indoor devices 1, the power is also supplied to the operation sensing portion 12 through these connecting terminals T2-T5. For example, when the indoor device 1 connected to the connecting terminals T2 is operating, power is supplied to the connecting terminal T2. Accordingly, power is supplied to photo-coupler PC1 through resistor R1, and the photo-transistor of the photo-coupler PC1-is turned on. A 12 V power is then supplied to resistor R9 through resistor R20 and the photo-transistor.

Figure 1:
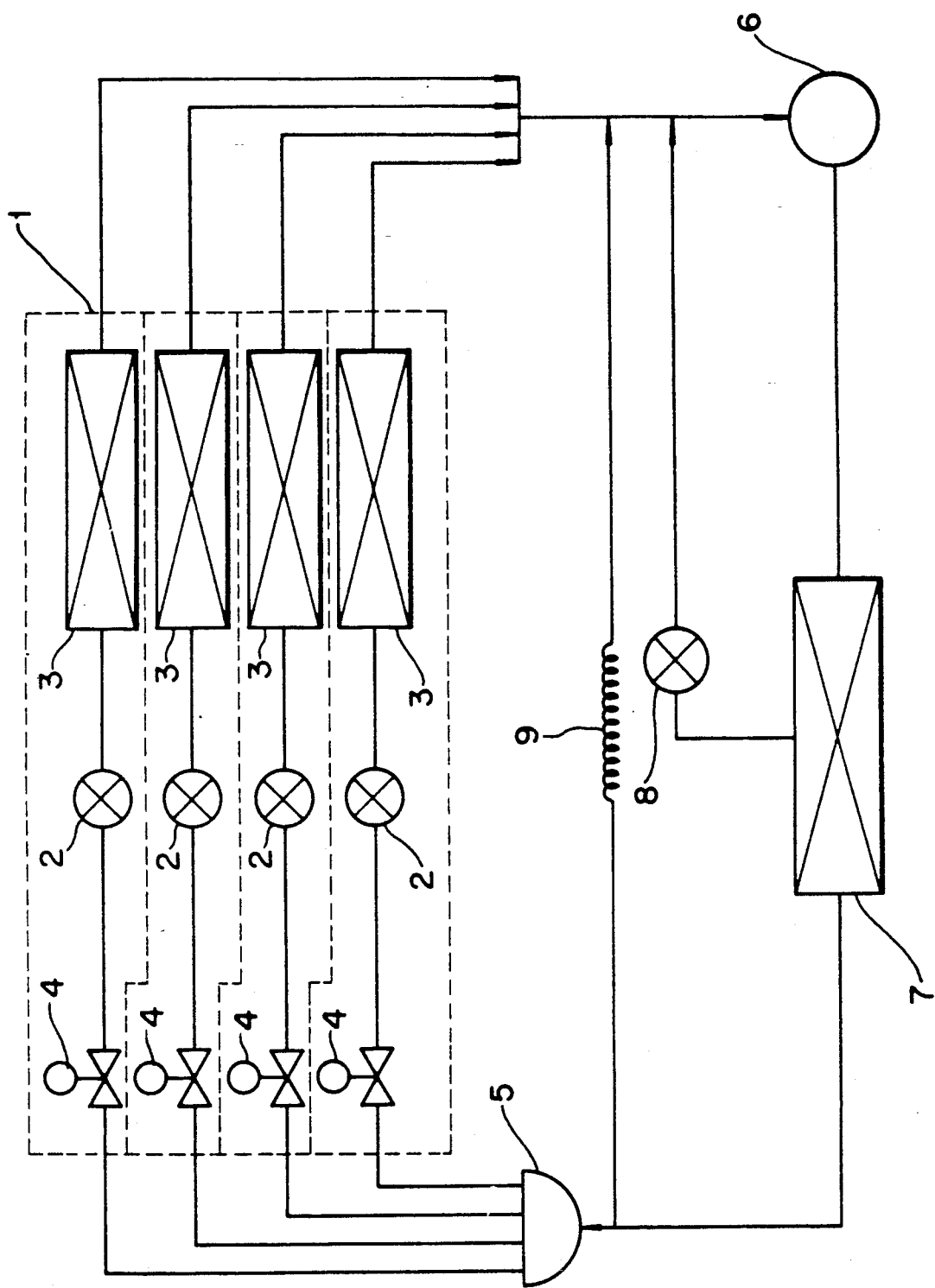
FIG. 1 is a block diagram showing a conventional refrigerating cycle.

Each of the indoor devices 1 corresponds to photo-couplers PC1, PC2, PC3 and PC4. The photo-transistor collectors are all connected to 12 V power through resistor R20, and the emitters are all connected to resistor R9. Thus, if at least one of the indoor devices 1 is operating (Four indoor devices are drawn in FIG. 1. However, the number of indoor devices actually used may be more or less than four.) The corresponding photo-transistor of the photo-coupler is turned on, so that power is supplied to resistor R9 through the device. In the embodiment shown in FIG. 1 and FIG. 4, four indoor devices 1 and four photo-couplers PC1-PC4 are illustrated, but more indoor devices may be used by adding a corresponding number of photo-couplers to the system according to the present invention.

At time t2 in FIG. 3 (b), if power is supplied to any one of the indoor devices 1 and any one of the photo-couplers PC1-PC4 is activated as described above, the 12 V power will be supplied to the time constant delay portion 13 through the driven photo-coupler. Accordingly, in the time constant delay portion 13, 12 V power is supplied to the base of transistor Q1, so that transistor Q1 is turned on. At this time, because the collector of transistor Q1 is grounded, ground voltage is applied to the base of transistor Q2, so that transistor Q2 is turned off. At time t2 in FIG. 3 (d), 12 V power is applied to the non-inverting+terminal of the operational amplifier IC3 and one terminal of capacitor C6, both of which are connected to the collector of transistor Q2 through resistor R13. The voltage divided by resistors R15 and R16 is applied to the inverting−terminal of the operational amplifier IC3 at time t2 as shown in FIG. 3 (c).

Accordingly, the operational amplifier IC3 compares the voltage supplied to the non-inverting+terminal with the voltage supplied to the inverting−terminal. Thus, when any one of the indoor devices is in operation, the voltage applied to the non-inverting+terminal is greater than the voltage applied to the inverting−terminal, so that the operational amplifier IC3 produces a high level voltage. The voltage output from the operation amplifier IC3 is supplied to the base of transistor Q3 through resistor R17, so that transistor Q3 is turned on. Because the collector of the transistor Q3 is grounded, the current from the 12 V power source flows into the ground through relay RY1 and transistor Q3, so that the relay coil is activated. At this time, the relay switch is connected to terminal NO, so that the A.C. power (A.C. 220 V) is applied to the compressor 6. As a result, the compressor 6 is activated.

Also, when all of the indoor devices are turned off at time t4 as shown in FIG. 3 (b), the photo-couplers PC1-PC4 are turned off so that the operation sensing portion 12 outputs a low level D.C. voltage. Accordingly, because the base of transistor Q1 is at a low voltage, transistor Q1 is turned off and transistor Q2 is turned on. At this time, the charging voltage of capacitor C6 is applied to the non-inverting+terminal of the operation amplifier IC3, and the voltage divided by resistors R15 and R16 is continuously applied to the inverting−terminal at time t4 as shown in FIG. 3 (C) voltage, so that the output of the operational amplifier IC3 is held until the charging voltage of capacitor C6 is completely discharged. Because the output of operational amplifier IC3 depends on the transistor Q1, the current passes through transistor Q1 and relay RY1 is then driven by the current.

That is to say, until the voltage of the capacitor C6 becomes lower than the voltage divided by resistors R15 and R16, operational amplifier IC3 outputs the driving voltage to the relay drive portion 14, and relay RY1 is driven by the driving voltage, so that the compressor 6 is powered by A.C. power (for example, A.C. 220 V). As shown in FIG. 3 (e), the compressor 6 operates during the time T2. Then, the pressure between the compressor 6 and the indoor devices 1 is adjusted so that even if the indoor devices 1 are immediately turned on after having been turned off, the compressor 6 begins operating at once.

As described above, the present invention was designed to add an operation sensing portion, time constant delay portion and relay drive portion to the outdoor device, whereby the compressor of the outdoor device is turned off after a determined length of time following the interruption of the indoor devices. Thereafter, it prevents the compressor from being reversely compressed in high pressure in the interruption of all the indoor devices and thereby from being overloaded. Thus, the life of a compressor is extended. Further because the unbalanced pressure of a compressor is prevented without using a bypass conduit, the design of the refrigerating cycle is compact.

What is claimed is:

1. An air conditioning system comprising:

an outdoor device having a compressor, a condenser, and a conduit leading from the condenser to the inlet of the compressor, said conduit having a valve being opened upon exceeding a predetermined pressure;

a plurality of indoor devices connected in parallel each other and operatively connected to said outdoor device, each indoor device having an evaporator and an expansion valve;

an operation sensing means, operatively connected to each of the indoor units, for sensing the operation state of the indoor devices and outputting an ON signal if at least one indoor device is in operation and outputting an OFF signal if all indoor devices are out of operation;

a delay means, operatively connected to the operation sensing means, for receiving the ON signal and the OFF signal from the operation sensing means and outputting the ON signal and the OFF signal after a predetermined delay; and, a relay drive means, operatively connected to the delay means and the compressor of the outdoor device, for turning ON and OFF the compressor of the outdoor device according to the delayed ON/-OFF signals of the delay means.

2. The air conditioning system according to claim 1, wherein said valve of said outdoor unit is opened by upon exceeding a predetermined pressure created by an operation of said relay means being delayed by said delay means.

* * * * *